United States Patent
Schmidt (10) Patent No.: US 10,829,209 B2
(45) Date of Patent: Nov. 10, 2020

(54) AIRCRAFT LANDING GEAR ASSEMBLY

(71) Applicant: Safran Landing Systems UK LTD, Gloucester (GB)

(72) Inventor: Robert Kyle Schmidt, Gloucester (GB)

(73) Assignee: Safran Landing Systems UK LTD (GB)

( * ) Notice: Subject to any disclaimer, the term of this patent is extended or adjusted under 35 U.S.C. 154(b) by 300 days.

(21) Appl. No.: 15/955,910

(22) Filed: Apr. 18, 2018

(65) Prior Publication Data

US 2018/0305000 A1 Oct. 25, 2018

(30) Foreign Application Priority Data

Apr. 20, 2017 (EP) .................................. 17167354

(51) Int. Cl.
*B64C 25/36* (2006.01)
*B60B 35/02* (2006.01)

(52) U.S. Cl.
CPC .............. *B64C 25/36* (2013.01); *B60B 35/02* (2013.01); *B60B 2360/1442* (2013.01); *B60B 2360/1454* (2013.01); *B60B 2900/111* (2013.01); *B60B 2900/3312* (2013.01); *B60Y 2200/51* (2013.01)

(58) Field of Classification Search
CPC .... B64C 25/34; B64C 25/36; B64C 2025/345
See application file for complete search history.

(56) References Cited

U.S. PATENT DOCUMENTS

| | | | | |
|---|---|---|---|---|
| 5,947,414 A | * | 9/1999 | Ralph | B64C 25/34 244/100 R |
| 6,065,719 A | * | 5/2000 | Ralph | B64C 25/34 180/24.1 |
| 6,123,292 A | * | 9/2000 | Ralph | B64C 25/34 244/103 R |
| 8,789,792 B2 | | 7/2014 | Lacroix et al. | |

FOREIGN PATENT DOCUMENTS

| | | |
|---|---|---|
| DE | 728620 C | 11/1942 |
| EP | 0492687 A1 | 1/1992 |
| EP | 492687 A1 * | 7/1992 |
| FR | 898049 A | 4/1945 |
| FR | 2953806 A1 | 6/2011 |

OTHER PUBLICATIONS

European Search Report for European Application No. 17167354.4, dated Sep. 13, 2017, 8 pages.

* cited by examiner

*Primary Examiner* — Richard R. Green
*Assistant Examiner* — Arfan Y. Sinaki
(74) *Attorney, Agent, or Firm* — RatnerPrestia (57) ABSTRACT

An aircraft landing gear bogie beam including first and second ends and a mounting bearing for connection to an aircraft landing gear main strut between the ends. Each end has a respective axle, and each axle defines a wheel mounting portion on each side of the bogie beam. The bogie beam is arranged to enable the first and second axles to each pivot relative to the bearing about a respective longitudinal axis of the bogie beam by an amount that is sufficient to place a wheel rim of a wheel assembly in contact with the ground in the event of a tyre of the wheel assembly deflating.

8 Claims, 5 Drawing Sheets

AIRCRAFT LANDING GEAR ASSEMBLY

This application claims the benefit of and priority to European Application No. 17167354.4, filed on Apr. 20, 2017, the contents of which are incorporated herein by reference.

BACKGROUND

An aircraft landing gear for medium to large aircraft typically includes a pair of wheel assemblies mounted on a common axle. For larger aircraft, a landing gear may include an elongate bogie beam which supports two or more axles, each of which carries a pair of wheel assemblies.

A landing gear is designed to withstand operation loads when one of the tyres on an axle is deflated. In the case of a multi axle landing gear, the gear must be designed to withstand operation loads arising from a worst case combination of deflated tyres.

The present inventor has identified that the weight of known landing gear can be reduced.

SUMMARY

In accordance with a first aspect of the invention there is provided an aircraft landing gear assembly comprising:
- an elongate bogie beam including a mounting formation via which the bogie beam is arranged to be movably mounted to an aircraft landing gear main strut, first and second end regions, a first longitudinal axis extending between the mounting formation and the first end region and a second longitudinal axis extending between the mounting formation and the second end region;
- a first axle mounted at a first end region of the bogie beam, the first axle defining a first wheel mounting portion on a first side of the bogie beam for supporting a first wheel assembly and a second wheel mounting portion on a second side of the bogie beam for supporting a second wheel assembly; and
- a second axle mounted at a second end region of the bogie beam, with the mounting formation between the first and second end regions, the second axle defining a third wheel mounting portion on the first side of the bogie beam for supporting a third wheel assembly and a fourth wheel mounting portion on the second side of the bogie beam for supporting a fourth wheel assembly,
- wherein the bogie beam is arranged to enable the first and second axles to each pivot relative to the mounting formation about the longitudinal axis of the bogie beam by an amount which is sufficient to place a wheel rim of a wheel assembly in contact with the ground in the event of a tyre of the wheel assembly deflating.

Thus, the bogie beam provides sufficient degrees of freedom to ensure that the wheel loads are equal for various degrees of tyre inflation and/or runway camber.

The bogie beam may be arranged to enable the first and second axles to each pivot relative to the mounting formation about the longitudinal axis of the bogie beam by at least 8°.

The mounting formation of the bogie beam can be a circular cross section profiled bearing arranged to pivotally couple the bogie beam to the main strut via a pivot pin.

The first longitudinal axis can be coaxial with respect to the second longitudinal axis.

The bogie beam can be arranged to enable the first and second axles to each pivot relative to the mounting formation about the longitudinal axis of the bogie beam by virtue of first and second flexure zones of the bogie beam, the first flexure zone being located between the mounting formation and the first axle and the second flexure zone being located between the mounting formation and the second axle. Flexure zones advantageously require no maintenance and do not suffer from operational contact wear.

The flexure zones can each comprise a portion of the bogie beam which has a box section, C section or I section profile.

The flexure zones can each occupy a majority of the length of the bogie beam between the mounting formation and the respective axle.

The bogie beam can comprise a central body portion which includes the mounting formation and a pair of rotatable mounted end bosses which support the axles, the bogie beam being arranged to enable the first and second axles to each pivot relative to the mounting formation about the longitudinal axis of the bogie beam by virtue of the end bosses. Such an arrangement can be simpler to design and can be tailored to specific load requirements based on the configurations of the joints and bearings employed.

In accordance with a second aspect of the present invention, there is provided an aircraft landing gear assembly comprising:
- a first elongate bogie beam including a first mounting formation via which the first bogie beam is arranged to be pivotally mounted to an aircraft landing gear main strut and defining a first bogie pivot axis;
- a second elongate bogie beam including a second mounting formation, defining a second bogie pivot axis, via which the second bogie beam is arranged to be pivotally mounted to the aircraft landing gear main strut in a side by side adjacent relationship with the first bogie pivot axis being coaxial with respect to the second bogie pivot axis;
- a first axle mounted at a first end region of the first bogie beam, the first axle defining a first wheel mounting portion on a first side of the first bogie beam for supporting a first wheel assembly;
- a second axle mounted at a second end region of the first bogie beam, the second axle defining a second wheel mounting portion on the first side of the first bogie beam for supporting a second wheel assembly;
- a third axle mounted at a first end region of the second bogie beam, the third axle defining a third wheel mounting portion on a second side of the second bogie beam for supporting a first wheel assembly, the second side facing away from the first bogie beam; and
- a fourth axle mounted at a second end region of the second bogie beam, the fourth axle defining a fourth wheel mounting portion on the second side of the bogie beam for supporting a fourth wheel assembly,
- such that the first and second bogie beams can independently pivot about the respective bogie pivot axes in order to place a wheel rim of a wheel assembly in contact with the ground in the event of a tyre of the wheel assembly deflating.

Thus, two parallel bogie beams are provided in a 'dual bicycle' arrangement in which the bogie beams can pivot about their mounting axes independently to account for any difference in rolling radius between the front and back tyres. Such an arrangement can limit the number of joints requiring maintenance. The splitting of the bogie beams can also permit a segregation of the systems supporting braking and, if necessary, brake torque compensation, which can be advantageous from a safety perspective.

The aircraft landing gear assembly can further comprise the aircraft landing gear main strut, the main strut comprising:
- a body portion including a main aircraft coupling via which the main strut is arranged to be movably coupled to an aircraft;
- a bogie mounting portion including a first axle portion arranged to pivotally mount the first bogie beam via the first mounting formation and a second axle portion arranged to pivotally mount the second bogie beam via the second mounting formation; and
- a flexible or dynamic bearing region connecting the body portion to the bogie mounting portion for pivotal movement between them.

The flexible or dynamic bearing region can comprise a spherical bearing. This enables the landing gear assembly to place the wheel rims on one side of the landing gear in contact with the ground in the event of their tyres deflating when the wheels on the other side are inflated.

In accordance with a further aspect of the invention, there is provided an aircraft including one or more aircraft landing gear assemblies according to the first aspect or the second aspect.

BRIEF DESCRIPTION OF THE DRAWINGS

Embodiments of the invention will now be described with reference to the accompanying drawings, in which.

DETAILED DESCRIPTION

Figure 1A:
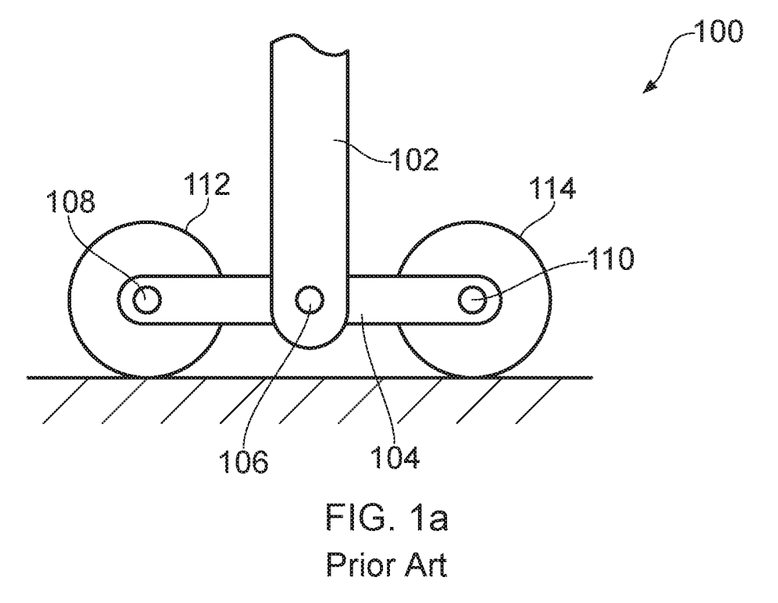
FIG. 1a is a schematic side view of a known aircraft landing gear assembly including a bogie beam.

FIG. 1a illustrates a known aircraft landing gear assembly generally at 100.

The landing gear assembly 100 includes a main strut 102 which is movably coupled to an aircraft (not shown). A bogie beam 104 is pivotally mounted at a lower end of the main strut 102 via a pivot pin 106. At one end, or front, of the bogie beam 104 there is mounted a wheel assembly 112 on axle 108. At the other end, or back, of the bogie beam 104 there is mounted a second wheel assembly 114 via a second axle 110. Each wheel assembly can incorporate a brake assembly.

Figure 1B:
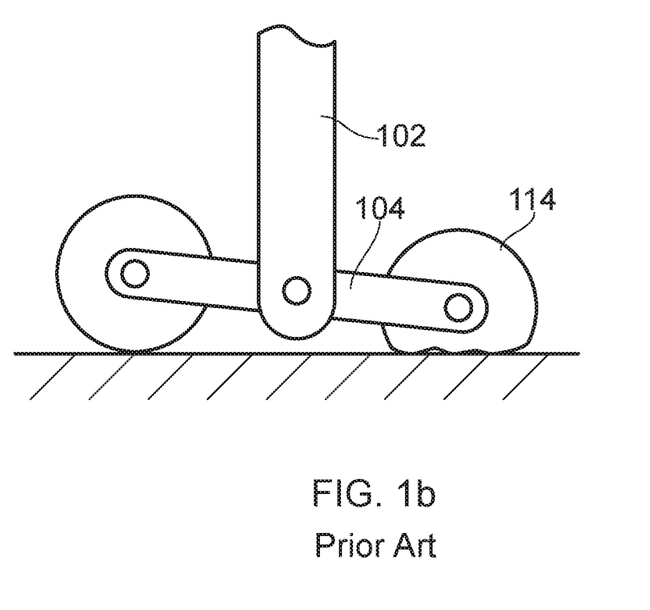
FIG. 1b illustrates the landing gear assembly of FIG. 1a with a deflated tyre.

FIG. 1b shows the landing gear assembly of FIG. 1a with a deflated rear tyre 114. As can be seen, the bogie beam 104 has rotated relative to the strut 102 to account for the difference in rolling radius due to the deflated tyre 114.

Figure 2A:
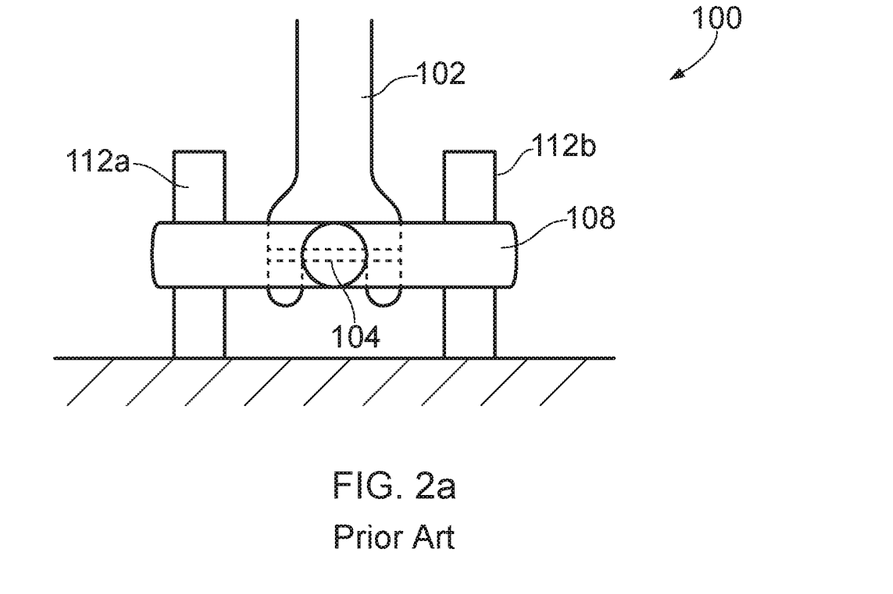
FIG. 2a is a schematic front view of a known landing gear assembly in which two wheels are mounted on a common axle.
Figure 2B:
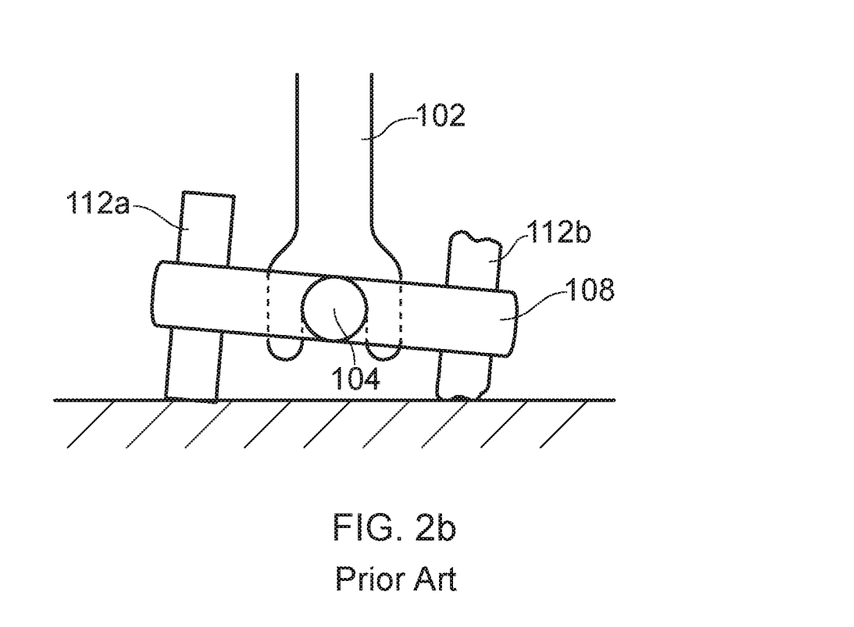
FIG. 2b illustrates the landing gear assembly of FIG. 2a with a deflated tyre.

However, as illustrated in FIGS. 2a and 2b, in the case of landing gear assemblies in which a pair of wheel assemblies 112a, 112b are mounted on a common axle 108, and one wheel 112b deflates, the bogie beam 104 cannot pivot to account for the deflated tyre 112b because the end region of the bogie beam 104 adjacent the axle 108 is supported by the inflated tyre 112a. This results in flexure of the landing gear components including the axle 108, bogie beam 104 and strut 102. Consequently, these components must be of sufficient size and/or strength to withstand such loading. Other components of the landing gear also need to be sized to deal with the increased load on them i.e. the full load taken on three tyres, or the full load taken on two tyres.

The present inventor has identified that the weight of known landing gear can be reduced by designing a landing gear assembly in which the bogie beam is arranged to place a wheel rim of a wheel assembly in contact with the ground in the event of a tyre of the wheel assembly deflating. As such, the landing gear can be designed for the full load distributed evenly across four loading points (tyre or wheel rim).

Figure 3:
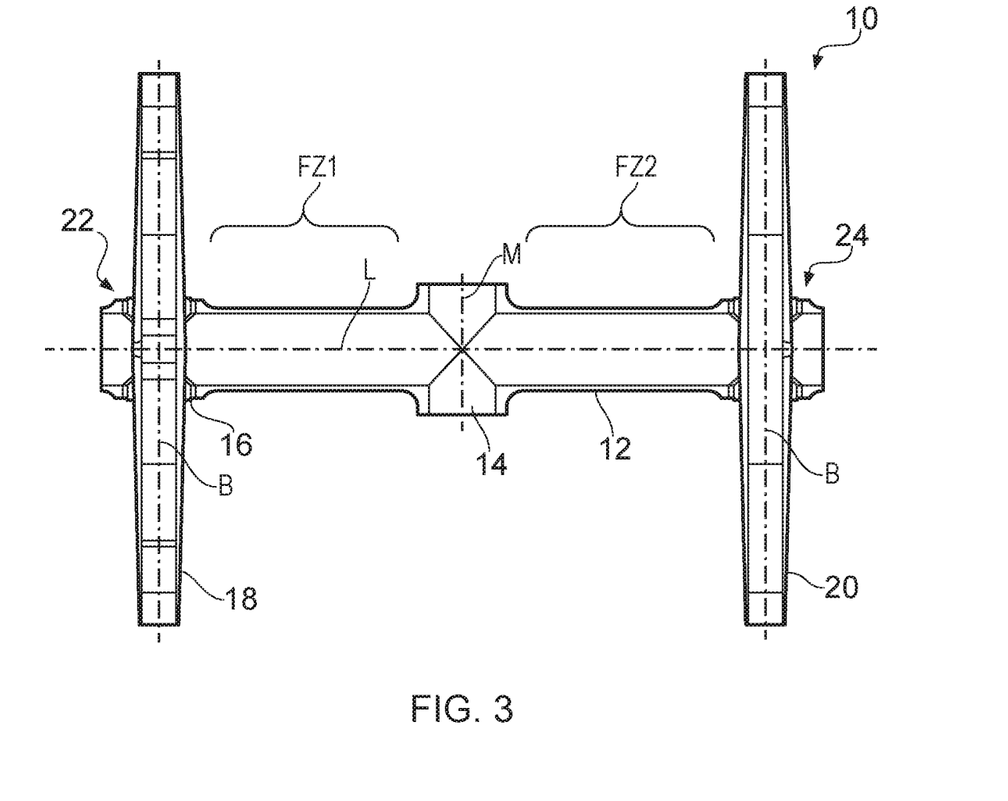
FIG. 3 is a longitudinal cross section diagram of an aircraft landing gear assembly according to an embodiment of the present invention.

FIG. 3 is a diagram of part of an aircraft; more specifically, an aircraft landing gear assembly 10 according to an embodiment of the invention. The landing gear assembly 10 is shown in cross section through the longitudinal axis of the bogie beam 12.

The bogie beam 12 is generally of conventional construction in that it includes a central pivot bearing 14 by which it can be pivotally connected to an aircraft landing gear main strut (not shown), such as a rigid strut or a shock absorbing strut, so as to pivot about a bogie pivot axis M.

At a first end region 22, the bogie 12 includes axle mounting bushes 16 in which a first axle 18 is mounted. A second end region 24 of the bogie 12 also includes axle mounting bushes 16 via which a second axle 20 is mounted. The longitudinal axis B of the first axle 18 is parallel with respect to the longitudinal axis B of the second axle 20.

The aircraft landing gear assembly 10 of the illustrated embodiment differs from a conventional aircraft landing gear assembly in that it includes flexure zones FZ1, FZ2.

The first flexure zone FZ1 is located between the bogie pivot bearing 14 and the first axle 18. It encompasses a majority of the length of the bogie beam 12 between these two items. However, in other embodiments the flexure zone can be defined by the entirety of the distance between the bogie pivot bearing 14 and the first axle 18, or the flexure zone FZ1 can be defined by less than half the distance between these two items.

Similarly, the second flexure zone FZ2 is located on the other side of the bogie beam 12 between the bogie pivot bearing 14 and the second axle 20. Otherwise, the second flexure zone FZ2 can be identical to the first flexure zone FZ1.

The flexure zones FZ1, FZ2 are arranged to permit the axles 18, 20 to rotate relative to bogie pivot bearing 14 about the longitudinal axis L of the bogie beam. As such, in the event of a tyre deflating, the bogie beam 12 can flex to allow the axle to rotate sufficiently to place the deflated wheel assembly in contact with the ground, meaning that each wheel is equally loaded despite the deflated tyre(s). For a wheel assembly with a deflated tyre, the load can be supported by the wheel rim.

The present inventor found a bogie beam 12 with flexure zones FZ1, FZ2 of box section, or open section, such as C or I section, can provide the required degree of flexure in the event of a tyre deflation. Suitable geometries can be determined using routine testing.

Figure 4:
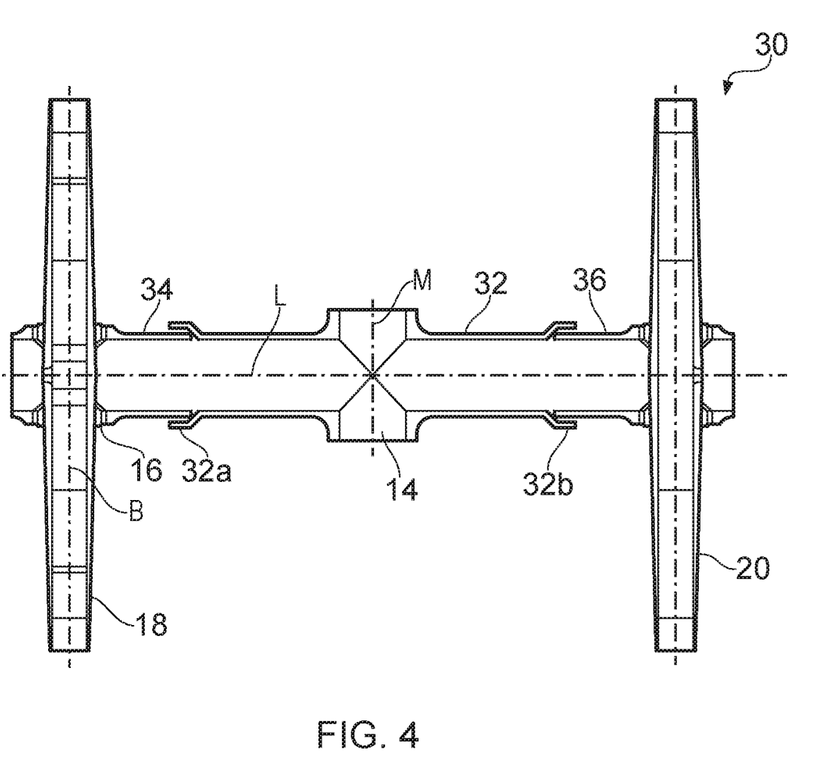
FIG. 4 is a longitudinal cross section diagram of an aircraft landing gear assembly according to an embodiment of the present invention.

FIG. 4 shows an aircraft landing gear assembly according to a further embodiment of the invention generally at 30. The aircraft landing gear assembly 30 is similar to the aircraft landing gear 10 according to the previous embodiment and like parts have been given like reference numerals. For brevity, the following description will focus on the differences.

The aircraft landing gear assembly 30 of the present embodiment is configured to enable the axles 18, 20 to rotate or pivot relative to the bogie pivot axis M about the longitudinal axis L of the bogie beam by virtue of rotatable end sections 34, 36.

More specifically, the bogie beam 32 comprises a main body portion 32 which has cylindrical end bearings 32a, 32b at its ends. The end bearings 32a, 32b are arranged to rotatably support first and second end bosses 34, 36 such that the end bosses 34, 36 can rotate relative to the bogie body 32 about the longitudinal axis L. The bosses 32, 36 each include axle mounting bushes 16 arranged to mount the first and second axles, 18, 20 in the conventional manner.

In the event of a tyre on an axle deflating, the boss and axle can rotate together relative to the bogie beam in order to place the rim of the deflated wheel assembly in contact with the ground, thereby equalizing loading on the wheel.

Means can be provided to maintain the orientation of the axles 18, 20 relative to the bogie pivot axis M during 'weight off wheels' operations such as pre-touchdown landing descent and immediately following take off. For example, biasing means such as springs may be provided to bias the axles to parallel planes with respect to the longitudinal axis and bogie pivot axis M, the spring forces being such that it can be overcome in the event of a tyre deflating.

Thus, both of the above-identified embodiments of the invention include a bogie beam which is arranged to permit the axles to rotate relative to the central portion of the encompassing the bogie pivot axis in the event of tyre deflation.

Figure 5:
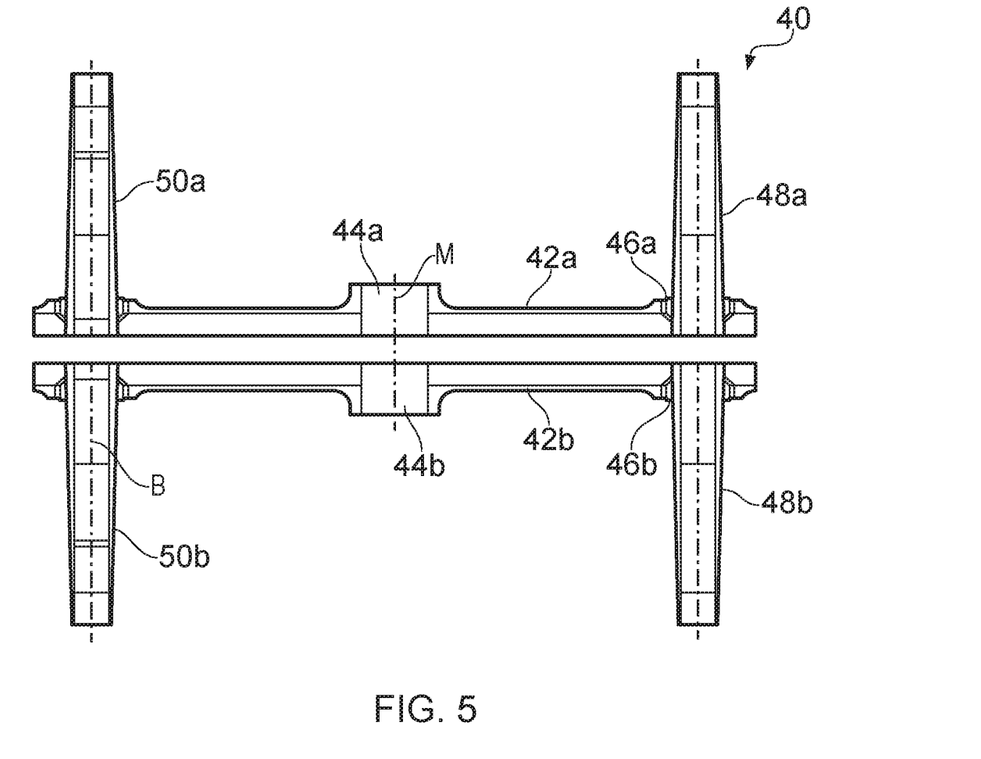
FIG. 5 is a longitudinal cross section diagram of an aircraft landing gear assembly according to an embodiment of the present invention.

FIG. 5 shows an aircraft landing gear assembly 40 according to a further embodiment of the invention. The landing gear assembly 40 includes first and second bogie beams 42a, 42b arranged to be mounted in a parallel side by side relationship. The bogie beams 42a, 42b each include identical pivot bearings 44a, 44b arranged to receive a common bogie pivot pin, or coaxial bogie pivot pins, (not shown) so that the bogie beams 42a, 42b pivot about a common bogie pivot axis M.

At a first end, the first bogie beam 42a includes a conventional mounting bushing 46a by which a first axle half 50a is mounted. The second bogie beam 42b includes a corresponding mounting bushing 46b which carries a second axle half 50b. The first and second axle halves 50a, 50b are aligned with a common axis B when the bogie beams 42a, 42b are aligned in registration with one another i.e. in the same plane.

Similarly, a second end of the first bogie beam 42a includes a conventional mounting bushing 46a which mounts a third axle half 48a and the second 42b includes a conventional mounting bushing 26b which mounts a fourth axle half 48b.

Each axle half 50a, 50b, 48a, 48b, is arranged to mount a single wheel assembly.

Therefore, in the event of the tyre of a wheel assembly mounted on the first axle half 50a deflating, the first bogie 42a can rotate about the bogie pivot axis M independently of the second bogie 42b so as to place the rim of the deflated wheel assembly in contact with the ground. Likewise for any of the other wheel assemblies.

While the arrangement of the landing gear assembly 40 reduces the amount of flexure required by components of the aircraft landing gear in order to account for the deflated tyre, it does not substantially eliminate such flexure.

Figure 6:
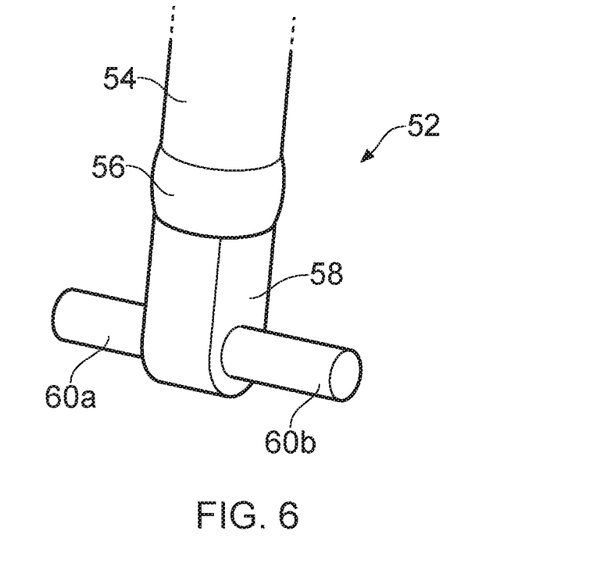
FIG. 6 is a schematic diagram illustrating a bottom end of a strut which can carry the landing gear assembly of FIG. 5.
Figure 7A:
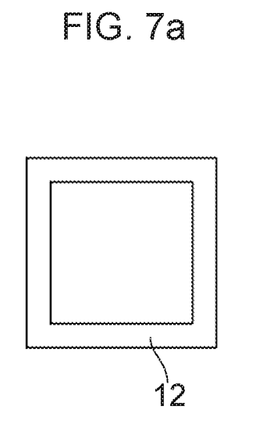
FIGS. 7a-7c schematically illustrate a cross section view of a bogie beam flexure zone, as viewed along a longitudinal axis of the bogie beam, in which the cross section comprises a box section, a C section, and an I section, respectively.
Figure 7B:
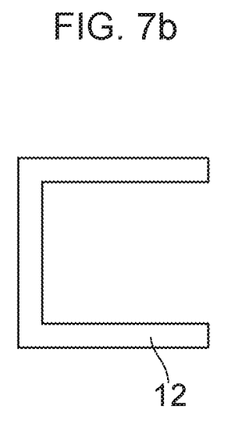
Figure 7C:
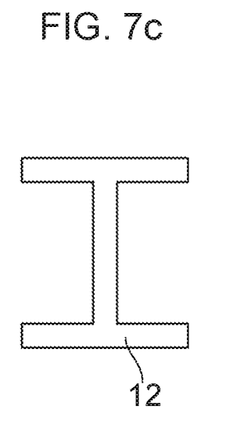

Therefore, and referring additionally to FIG. 6, the strut 52 can comprise an upper strut portion 54 arranged to be movably coupled to an aircraft (not shown) and a bogie mounting formation 58 connected to the upper portion 54 via a multi-axis joint 56, such as a spherical joint. The bogie mounting formation 58 can include a first axle portion 60a arranged to mount the first bogie beam 42a, and a second, coaxial, axle 60b arranged to mount the second bogie beam 42b. Thus, the bogie mounting formation 58 can move relative to the upper strut portion 54 in a lateral direction to substantially isolate the remaining components of the landing gear assembly from loads that would otherwise be imparted due to tyre deflation.

In any embodiment, it is preferred that the bogie beam is arranged to enable the first and second axles to each pivot relative to the mounting formation about the longitudinal axis of the bogie beam by at least 8° and in some embodiments at least 10° or 12°. The degree of pivoting required depends on the ratio of tyre rolling radius to wheel rim radius and the spacing between the two wheel assemblies on the axle. In one example, a wheel assembly may have a rolling radius of approximately 0.65 m, a wheel rim radius of approximately 0.36 m and a spacing of approximately 1.4 m centre to centre between wheel assemblies on an axle, meaning that one flat tyre would require an angle of approximately 12° to place the wheel rim in contact with the ground in the event of the tyre fully deflating. In another example, a wheel assembly may have a rolling radius of approximately 0.65 m, a wheel rim radius of approximately 0.36 m and a spacing of approximately 1.74 m centre to centre between wheel assemblies on an axle, meaning that one flat tyre would require an angle of approximately 9.6° to place the wheel rim in contact with the ground in the event of the tyre fully deflating.

Landing gear assemblies according to embodiments of the invention can be formed of conventional aerospace materials, such as stainless steel, aluminum or titanium. Certain components such as the bogie beam can be formed from fibre reinforced composite material.

Landing gear assemblies according to embodiments of the invention can be main landing gear assemblies for medium to large aircrafts.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
an elongate bogie beam including a bearing via which the bogie beam is arranged to be movably mounted to an aircraft landing gear main strut, a first end region, a second end region, a first longitudinal axis extending between the bearing and the first end region and a second longitudinal axis extending between the bearing and the second end region;

a first axle mounted at the first end region of the bogie beam, the first axle defining a first wheel mounting portion on a first side of the bogie beam for supporting a first wheel assembly and a second wheel mounting portion on a second side of the bogie beam for supporting a second wheel assembly;

a second axle mounted at the second end region of the bogie beam, with the bearing between the first end region and the second end region, the second axle defining a third wheel mounting portion on the first side of the bogie beam for supporting a third wheel assembly and a fourth wheel mounting portion on the second side of the bogie beam for supporting a fourth wheel assembly, wherein the bogie beam is arranged to enable the first axle and the second axle to each pivot relative to the bearing about a respective on of the first longitudinal axis and the second longitudinal axis by an amount which is sufficient to place a wheel rim of a wheel assembly in contact with a ground surface upon which the landing gear rests in an event of a tyre of the wheel assembly deflating;

wherein the bogie beam is arranged to enable the first axle and the second axle to each pivot relative to the bearing about a respective one of the first longitudinal axis and the second longitudinal axis by virtue of a respective first flexure zone and a respective second flexure zone, the first flexure zone being located between the bearing and the first axle and the second flexure zone being located between the bearing and the second axle.

2. The aircraft landing gear assembly according to claim 1, wherein the bogie beam is arranged to enable the first axle and the second axle to each pivot relative to the bearing about a respective one of the first longitudinal axis and the second longitudinal axis by at least 8°.

3. The aircraft landing gear assembly according claim 1, wherein the bearing of the bogie beam is a circular bearing arranged to pivotally couple the bogie beam to the main strut via a pivot pin.

4. The aircraft landing gear assembly according to claim 1, wherein the first longitudinal axis is coaxial with respect to the second longitudinal axis.

5. The aircraft landing gear assembly according to claim 1, wherein the first flexure zone and the second flexure zone each comprises a portion of the bogie beam which has a box section, C section or I section profile.

6. The aircraft landing gear assembly according to claim 1, wherein the first flexure zone and the second flexure zone each occupies a majority of a respective length of the bogie beam between the bearing and the respective axle.

7. The aircraft landing gear assembly according claim 1, wherein the bogie beam comprises a central body portion which includes the bearing and a pair rotatable mounted end bosses which support the axles, the bogie beam being arranged to enable the first and second axles to each pivot relative to the bearing about the longitudinal axis of the bogie beam by virtue of the end bosses.

8. An aircraft including one or more aircraft landing gear assemblies according to claim 1.

* * * * *

UNITED STATES PATENT AND TRADEMARK OFFICE
CERTIFICATE OF CORRECTION

PATENT NO. : 10,829,209 B2  
APPLICATION NO. : 15/955910  
DATED : November 10, 2020  
INVENTOR(S) : Robert Kyle Schmidt Page 1 of 1

It is certified that error appears in the above-identified patent and that said Letters Patent is hereby corrected as shown below:

In the Claims

In Column 7, Claim 1, Line 22, "about a respective on of the first..." should read – about a respective one of the first –

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*